United States Patent [19]

Steele

[11] Patent Number: 4,870,811
[45] Date of Patent: Oct. 3, 1989

[54] GASOLINE POWERED ELECTRICAL LAWN MOWER

[76] Inventor: Robert M. Steele, 124 Dogwood La., West Columbia, S.C. 29169

[21] Appl. No.: 276,919

[22] Filed: Nov. 28, 1988

[51] Int. Cl.⁴ .................... A01D 34/03; A01D 34/37; A01D 75/00
[52] U.S. Cl. ................................ 56/10.5; 56/10.8; 56/16.9
[58] Field of Search ............... 56/10.5, 10.6, 10.7, 56/10.8, 11.9, 16.9

[56] References Cited

U.S. PATENT DOCUMENTS

| | | | |
|---|---|---|---|
| Re. 24,594 | 1/1959 | Smith | 56/10.5 |
| 2,229,912 | 1/1941 | Baily . | |
| 2,523,014 | 9/1950 | Gooch | 56/10.6 |
| 2,698,507 | 1/1955 | Siebring | 56/10.8 X |
| 2,958,175 | 11/1960 | Sprinkle | 56/10.6 |
| 3,212,244 | 10/1965 | Wilgus | 56/11.9 X |
| 3,696,593 | 10/1972 | Thorud et al. | 56/17.5 |
| 4,306,402 | 12/1981 | Whimp | 56/10.6 X |
| 4,333,302 | 1/1982 | Thomas et al. | 56/10.5 |
| 4,559,768 | 12/1985 | Dunn | 56/16.9 |
| 4,618,019 | 10/1986 | Ando et al. | 180/219 |

Primary Examiner—George A. Suchfield
Attorney, Agent, or Firm—Benoni O. Reynolds

[57] ABSTRACT

An apparatus, in combination with a conventional electrically powered hand or rider lawn mower, which provides a detachable electrical power source for such lawn mowers and one or more auxiliary electrical hand tools. The apparatus has an electrical generator powered by a gasoline engine and a control box all of which are mounted by support elements on a rectangular shaped tubular frame. The tubular frame is attached by four or more retention clips to the protective shroud of a hand lawn mower or the rear deck of a rider lawn mower. The control box has two or more a.c. electrical outlets which can be used to feed electrical current to the lawn mower and/or auxiliary electrical hand tools such as weed eaters, blowers, hedge clippers or edgers. In an alternative mode, the apparatus can be temporarily removed from the lawn mowers for use with a Recreational Vehicle, a lighting system or outdoor pump.

4 Claims, 2 Drawing Sheets

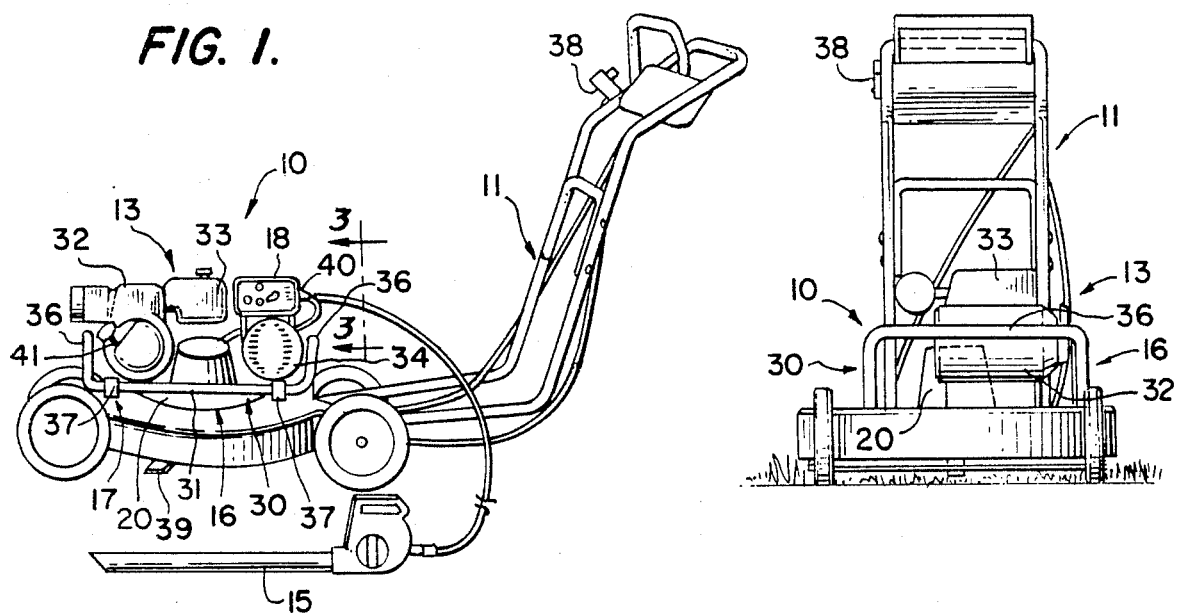
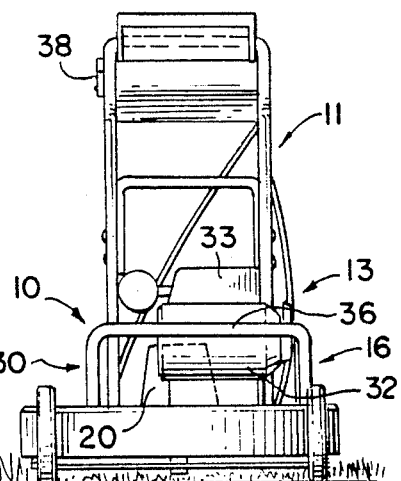
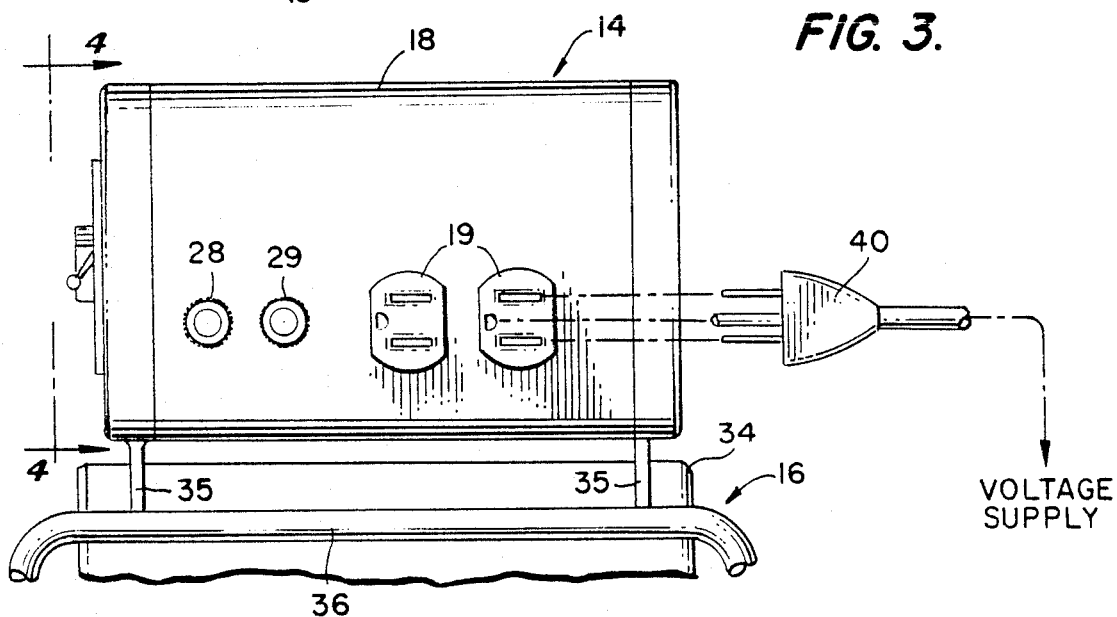
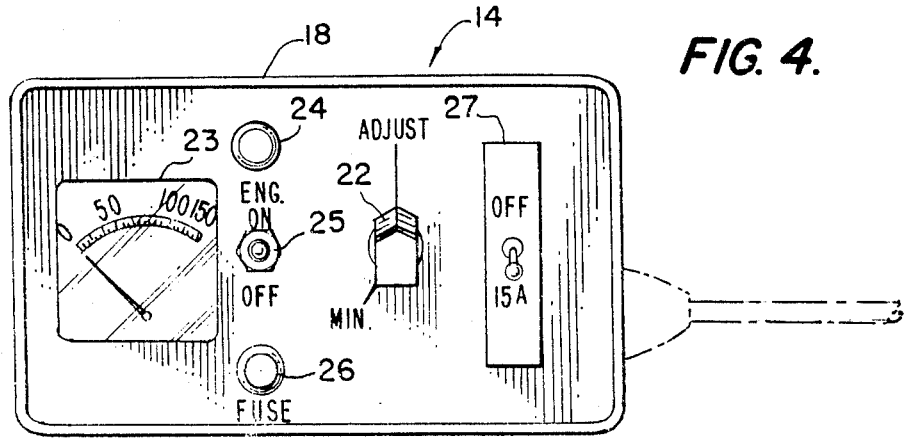

GASOLINE POWERED ELECTRICAL LAWN MOWER

BACKGROUND OF THE INVENTION (1) Field of the Invention

This invention relates to lawn mowers. In particular it relates to the generation of electricity for electrically powered hand and rider lawn mowers and for auxiliary electrical hand tools used in connection with yard care.

(2) Description of the Prior Art

Lawn mowers arbitrarily fall into three categories, electrically powered, gasoline powered or manually operated. Electrically powered lawn mowers are usually the least expensive but pose a danger because of the need for a lengthy power cord which may be struck by the blades of the lawn mower. Gasoline powered mowers are apt to be more expensive because they have more component parts and they are more complicated to operate than electrically powered lawn mowers. Gasoline powered mowers may have either a direct drive or an electrical drive. Manual lawn mowers have mechanical linkage to rotate a ferris wheel type of blade array as the lawn mower is pushed along on its wheels.

Bailey, U.S. Pat. No. 2,229,912, in 1941, disclosed an electrical generator powered by a gasoline engine. The generator was used to run a motor which displaced penetrable matter, such as earth. Gooch, in 1950, U.S. Pat. No. 2,523,014, disclosed the use of a gasoline engine or an electrical motor as prime movers to operate a hydraulically driven lawn mower.

Smith, in 1955, U.S. Pat. No. 2,702,448, disclosed a rotary type hand lawn mower in which power for driving the cutter is supplied from a battery mounted on the mower. Aside from the usual advantages of an electrically powered lawn mower, such as low cost and quietness, Smith emphasized the safety feature of eliminating the long power cord. Wilgus, in 1965, U.S. Pat. No. 3,212,244, disclosed a similar rechargeable storage battery to power a hand lawn mower but with the addition of a means to vertically adjust the position of the motor and the blades.

Thorud et al, in 1972, U.S. Pat. No. 3.696,593, introduced a Bendix type electrical starter powered by batteries carried on the handle of the hand lawn mower. He mentions the many difficulties associated with recoil and impulse starters previously in use to start gasoline powered lawn mowers. In 1982, Thomas et al, U.S. Pat. No. 4,333,302, disclosed the use of both an a.c. motor and a d.c. motor mounted side by side on an electrically powered lawn mower. The motors could be used singly or in tandem for added power. The mower operated on a d.c. battery. Gears and clutch arrangements provided for alternative uses of the a.c. and d.c. drive motors. Ando et al, in 1986, U.S. Patent No. 4,618,019, disclosed a motor cycle engine with two dynamos. A socket for taking off the output of the second dynamo is provided on the body of the motor cycle.

Although the prior art has offered means for the elimination of lengthy power cords for electrically powered lawn mowers, none discloses a detachable, independently operated power source which not only serves the needs for lawn mowing but for auxiliary electrical hand tools as well. The present invention meets the needs for grass cutting as well as the operation of weed eating, blowing, hedge trimming, and edging, regardless of the remoteness of the area in the yard being groomed. Also, the apparatus of the present invention constitutes a detachable, self contained generator for emergency uses as power for RV's (recreational vehicles), sawing and drilling operations, lights, pumps and anything electrical. In addition, the apparatus assures operation of the electrically operated lawn mowers and auxiliary electrical hand tools despite local power outages. Also, the 12 volt d.c. current of the apparatus of the present invention is available for recharging batteries of boats and automobiles.

Prior art known to this inventor includes the following U.S. Pat. Nos.:

| | | |
|---|---|---|
| 2,229,912 | 1/1941 | Baily |
| 2,523,014 | 9/1950 | Gooch |
| 2,702,448 | 2/1955 | Smith |
| 3,212,244 | 10/1965 | Wilgus |
| 3,969,593 | 10/1972 | Thorud et al |
| 4,333,302 | 1/1982 | Thomas et al |
| 4,618,019 | 10/1986 | Ando et al |

SUMMARY OF THE INVENTION

The present invention is a self-contained, detachable and portable apparatus for supplying electrical power to electrically powered lawn mowers and/or auxiliary hand tools used in lawn care.

The preferred embodiment of this invention is an apparatus, in combination with a conventional electrically powered hand or rider lawn mower and one or more auxiliary electrical hand tools, comprising:

a generating means for generating electrical current for the lawn mower and the hand tool, a control means, electrically connected between the generating means and the lawn mower and/or hand tool, for controlling the voltage of the electricity delivered by the generating means, a carrier means, attached to the generating means and to the control means, for supporting the generating means and the control means as contiguous units, a mounting means for detachably mounting the carrier means on the electrically powered hand or rider lawn mower.

Generating means of the present invention is a gasoline engine powered electrical generator which independently supplies alternating electrical current for operating the electrically powered lawn mowers or the electrical hand tools.

Control means of the present invention is a control box having two or more electrical outlets for detachably connecting the electrically powered lawn mowers or the auxiliary electrical hand tools to the generating means, and a rheostat to control the flow of electrical current from the generating means to the electrically powered lawn mower and the electrically powered hand tools through the electrical outlets.

Carrier means of this same invention is a rectangular shaped tubular frame having support elements to hold the generating means and the control means, and handles by which the carrier means can be lifted and transferred as a single unit.

Mounting means of this invention is four or more retention clips which fasten the carrier means to the electrically powered lawn mowers.

OBJECTIVES OF THE INVENTION

The objectives of the present invention are to provide an apparatus which, in combination with an electrically powered hand or rider lawn mower and auxiliary electrical hand tools will (1) eliminate the need for external power cords;

(2) provide a power source in remote areas of a yard for auxiliary electrical hand tools such as weed eaters, blowers, hedge trimmers and edgers;

(3) be detachable and portable for servicing and for independent emergency use as a power source for recreational vehicles (RV's), sawing or drilling tasks, or outdoor pumps;

(4) be simple to operate;

(5) support self-propelled or manual type electrically powered lawn mowers;

(6) be capable of charging batteries for boats and automobiles.

Other objectives and advantages of the present invention will be apparent during the course of the following detailed description.

BRIEF DESCRIPTION OF THE DRAWINGS

FIG. 1 is a perspective view from the left side of an apparatus constructed in accordance with the principles of the present invention detachably mounted on a conventional electrically powered hand lawn mower.

FIG. 2 is a front view of the apparatus of the same present invention showing the front handle of the carrier FIG. 3 is a fragmentary rear elevational view of the present invention taken along line 3—3 of FIG. 1 from the direction of the arrows showing the right side of the control means and the electrical outlets of the apparatus.

FIG. 4 is a fragmentary side view of the apparatus of the present invention taken along line 4—4 of FIG. 3 from the direction of the arrows showing the front of the control means.

DETAILED DESCRIPTION OF THE PREFERRED EMBODIMENT OF THE INVENTION

Figure 5:
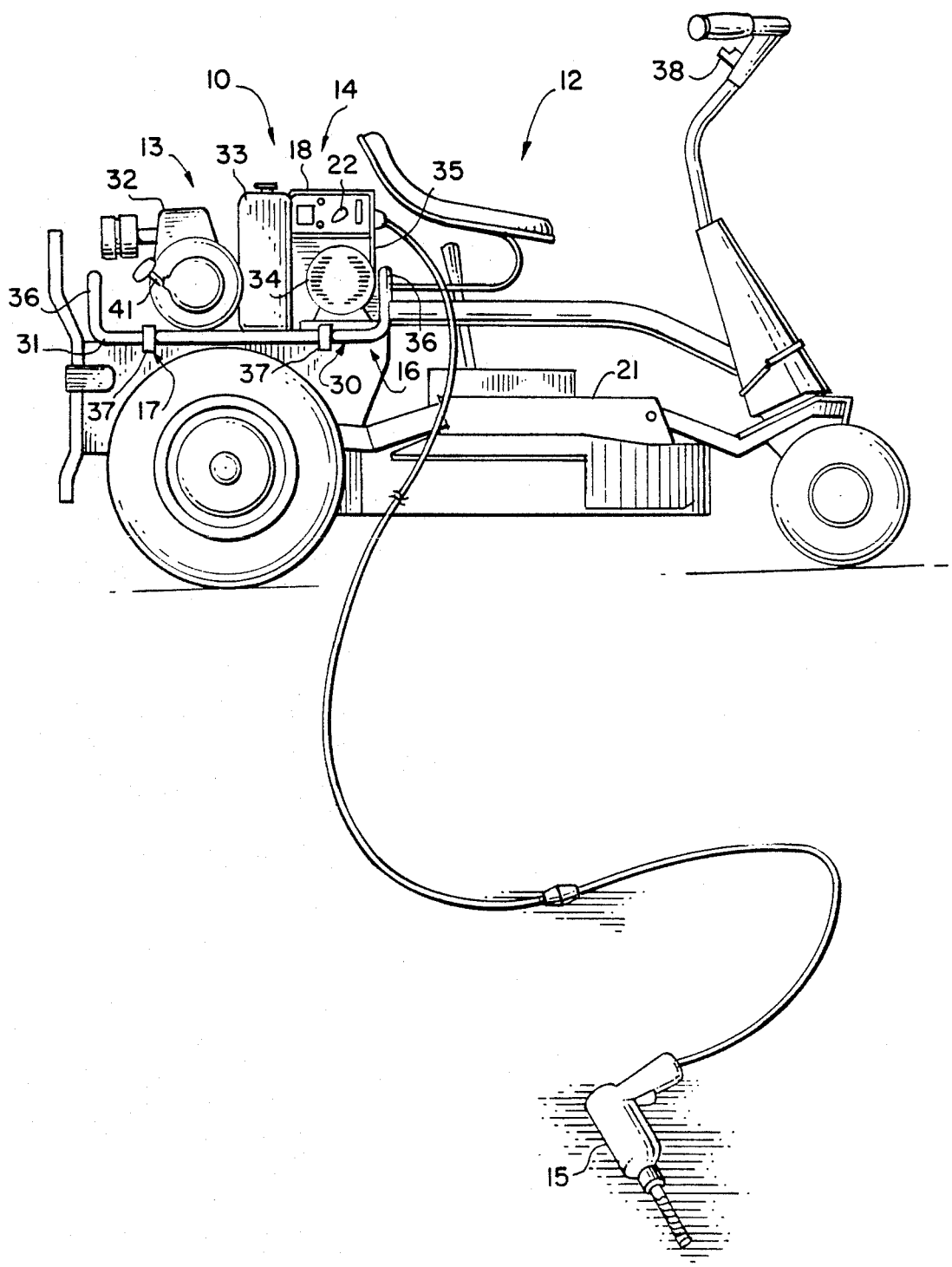
FIG. 5 is a perspective view of the apparatus of the present invention detachably mounted on a conventional electrically powered rider lawn mower.

The apparatus of the present invention is a compact, relatively light weight unit with is easily and quickly installed on, or removed from, a conventional electrically powered hand or rider lawn mower. It provides the electrical power not only for the lawn mower but for any auxiliary electrical hand tools which the user may see fit to use in grooming his yard. Throughout the following detailed description of the present invention like reference numerals are used to denote like parts disclosed in the accompanying drawings, FIGS. 1-5.

As shown in FIGS. 1, 2 and 5, the apparatus, shown generally at reference numeral 10, is used in combination with a conventional electrically powered hand lawn mower, shown generally at reference numeral 11 or with a conventional electrically powered rider lawn mower, shown generally at reference numeral 12. Apparatus 10 has a generating means, shown generally at reference numeral 13, for generating electrical current for hand lawn mower 11 or rider lawn mower 12. In addition, apparatus 10 has a control means, shown generally at reference numeral 14, which is electrically connected between generating means 13 and hand lawn mower 11 or rider lawn mower 12 and an electrical hand tool, such as shown at reference numeral 15. Control means 14 is for controlling the voltage of the electricity delivered by generating means 13 to hand mower 11 or rider mower 12 and/or any auxiliary electrical hand tool 15 which is being used.

A carrier means, shown generally at reference numeral 16, is attached to generating means 13 and to control means 14 for supporting generating means 13 and control means 14 as contiguous units. Mounting means, shown generally at reference numeral 17, is provided for detachably mounting carrier means 16 on hand lawn mower 11 or rider lawn mower 12.

As best shown in FIGS. 1 and 5, generating means 13 is a gasoline engine powered electrical generator which independently supplies alternating electrical current for operating hand lawn mower 11 or rider lawn mower 12 or an electrical hand tool such as shown at reference numeral 15.

As best shown in FIGS. 1 and 5, control means 14 is a control box 18 having two or more a.c. electrical outlets 19 for detachably connecting electrical drive motor 20 of hand lawn mower 11 or electrical drive motor 21 of rider mower 12, and/or auxiliary electrical hand tool 15, to generating means 13. Control box 18 also has a rheostat 22 to control the flow of electrical current from generating means 13 to hand lawn mower 11 or rider lawn mower 12 and said electrical hand tool 15 through electrical outlets 19. As shown in FIG. 4, a typical control box 18 (e.g. for a Honda generating system) also has a voltmeter 23, a pilot lamp 24, engine on/off switch 25, fuse holder 26 and a combination a.c. power switch and circuit breaker 27. As a typical generator initially generates 12 volts D.C. before the direct current is converted by a transformer to 120 volts a.c., control box 18 also has d.c. terminals 28 and 29 where 12 volts d.c. is available solely for charging batteries such as used in automobiles and boats.

As shown in FIGS. 1, 2 and 5, carrier means 16 is a rectangular shaped tubular frame, shown generally at reference numeral 30, preferably made of stainless steel. Tubular frame 30 has support elements (not shown) attached between the left and right hand lower portions 31 of tubular frame 30, to hold generating means 13 and control means 14. These support elements form a floor under gasoline engine 32, gasoline tank 33, and generator 34, the operating components of generating means 13. Gasoline engine 32 and generator 34 are coupled to one another by a belt (not shown). Control box 18 is mounted on top of generator 34 with two or more vertical posts 35. Tubular frame 30 also has end portions 36 which serve as handles by which carrier means 16 can be lifted and transferred as a single unit.

Mounting means 17 is four or more retention clips 37 which fasten carrier means 16 and the operating components of apparatus 10 to hand lawn mower 11 or rider lawn mower 12. Each of the retention clips 37 is a U-shaped, open ended, rubber covered, clamp, which permits lower portions 31 of tubular frame 30 to be slipped inside retention clamps 37 by a downward thrust and held frictionally therein. Similarly, the open end of retention clips 37 permits the carrier means 16 and the operating components of apparatus 10 to be easily and quickly removed from the mowers as a contiguous unit for servicing or emergency use with recreational vehicles, saw or drilling operations, or with an outdoor pump.

On/off switch 38, for the electric drive motors 20 or 21 only, is mounted on the handle of hand lawn mower 11 or of rider mower 12. This configuration permits the cutting blade such as shown at reference numeral 39 to be shut down without disturbing the operation of generator means 13. Gasoline engine 32 is turned on or off by engine on/off switch 25 on control box 18.

The apparatus of the present invention would differ only in size and capacity for rider lawn mower 12 as compared with hand lawn mower 11. In hand lawn mower 11, apparatus 10 would be mounted directly on top of the protective shroud and motor housing of the mower as shown in FIG. 1. In rider lawn mower 12, apparatus 10 would be mounted on the rear deck just behind the driver's seat of the mower as shown in FIG. 5. This rider mower configuration would be much like an electric golf cart. A grass catcher could be easily added to either mower.

In hand lawn mower 11, gasoline engine 32 ideally is a two cycle, 3.5 H.P., pull-to-start engine. Gasoline tank 33 can be quite small. Generator 34 can be 120 volts, 6.5 amps, with a capacity of about 800 watts.

In rider lawn mower 12, gasoline engine 32 can be a four cycle engine, 10 H.P., with a flywheel magneto ignition. Gasoline tank 33 would be considerably larger than used with the apparatus for hand lawn mower 11. Commercial applications of rider lawn mower 12 would have a 2 or 3 blade mower and a separate electric drive motor for locomotion. Generator 34 in this application would be 120 volts, 15 amps, with a capacity of 2000 watts. Rider lawn mower 12 would be used for large yards, estates, commercial lawn care companies and golf courses.

To remove carrier means 16 of the present invention from either hand lawn mower 11 or rider lawn mower 12, the user need only disconnect mower motor plug 40 from electrical outlet 19 and lift carrier means 16 straight upwards by means of the front and back handles formed by end portions 36 of tubular frame 30. The procedure is merely reversed for installing carrier means 16.

The starting procedure of apparatus 10 is like all similar generating systems. Engine on/off switch 25 is turned to "ON" and voltmeter 23 is set to the middle of its range by rheostat 22. The fuel valve is then turned to "ON" and the choke is fully closed. Recoil starter rope 41 is pulled slowly until resistance is felt, then it is pulled quickly to start gasoline engine 32. The choke is then opened as gasoline engine 32 warms up. Gasoline engine 32 can be stopped in an emergency by turning engine off/on switch 25 to "OFF". Normal stopping procedure is switching a.c. power switch 27 to "OFF". Next, turn engine on/off switch 25 to "OFF". Lastly, turn the fuel valve to "OFF".

I claim:

1. An apparatus, in combination with a conventional electrically powered hand or rider lawn mower, one or more auxiliary electrical hand tools, and a gasoline engine powered electrical generator which independently supplies electrical current for said lawn mower and said hand tools, comprising:
    a control means, electrically connected between said electrical generator and said lawn mower and/or hand tool, for controlling the amount of the voltage of the electricity delivered by said electrical generator,
    a carrier means, attached to said electrical generator and to said control means, for supporting said electrical generator and said control means as contiguous units,
    a mounting means for detachably mounting said carrier means on said electrically powered hand or rider law mower.
2. The apparatus of claim 1 wherein control means is a control box having
    two or more electrical outlets for detachably connecting said electrically powered lawn mowers or said auxiliary electrical hand tools to said electrical generator, and
    a rheostat to control the flow of electrical current from said electrical generator to said electrically powered lawn mower and said electrically powered hand tools through said electrical outlets.
3. The apparatus of claim 1 wherein carrier means is a rectangular shaped tubular frame having
    support elements to hold said electrical generator and said control means, and
    handles by which said carrier means can be lifted and transferred as a single unit.
4. The apparatus of claim 1 wherein mounting means is four or more retention clips which fasten said carrier means to said electrically powered lawn mowers.

* * * * *